United States Patent [19]

Anjan et al.

[11] Patent Number: 5,148,508
[45] Date of Patent: Sep. 15, 1992

[54] OPTICAL COUPLER HOUSING

[75] Inventors: Yellapu Anjan; Sam Habbel, both of Scottsdale; Joseph F. Straceski, Phoenix, all of Ariz.

[73] Assignee: Honeywell, Inc., Minneapolis, Minn.

[21] Appl. No.: 735,595

[22] Filed: Jul. 25, 1991

[51] Int. Cl.⁵ .................................................. G02B 6/26
[52] U.S. Cl. ........................................... 385/51; 385/42
[58] Field of Search ............... 350/96.15, 96.16, 96.20; 385/15, 42, 43, 46, 51, 70, 95, 99

[56] References Cited

U.S. PATENT DOCUMENTS

| 4,482,203 | 11/1984 | Stowe et al. | 350/96.15 |
|---|---|---|---|
| 4,714,316 | 12/1987 | Moore et al. | 350/96.20 |
| 4,801,185 | 1/1989 | Bricheno | 350/96.15 |
| 4,842,359 | 6/1989 | Imoto et al. | 385/51 X |
| 4,992,122 | 2/1991 | Rayit | 350/96.15 X |
| 4,997,247 | 3/1991 | Stowe | 350/96.15 |

Primary Examiner—John D. Lee
Attorney, Agent, or Firm—Theodore F. Neils

[57] ABSTRACT

The present invention relates to a housing for an optical coupler. The housing includes a primary protective body having a receiving space therein, wherein the coupled portion of the coupler is positioned. A support material at least partially about the coupled portion of the coupler extends in the receiving space to the primary protective body. The support material is resilient and has an index of refraction less than that of the coupled portion of the coupler.

17 Claims, 1 Drawing Sheet

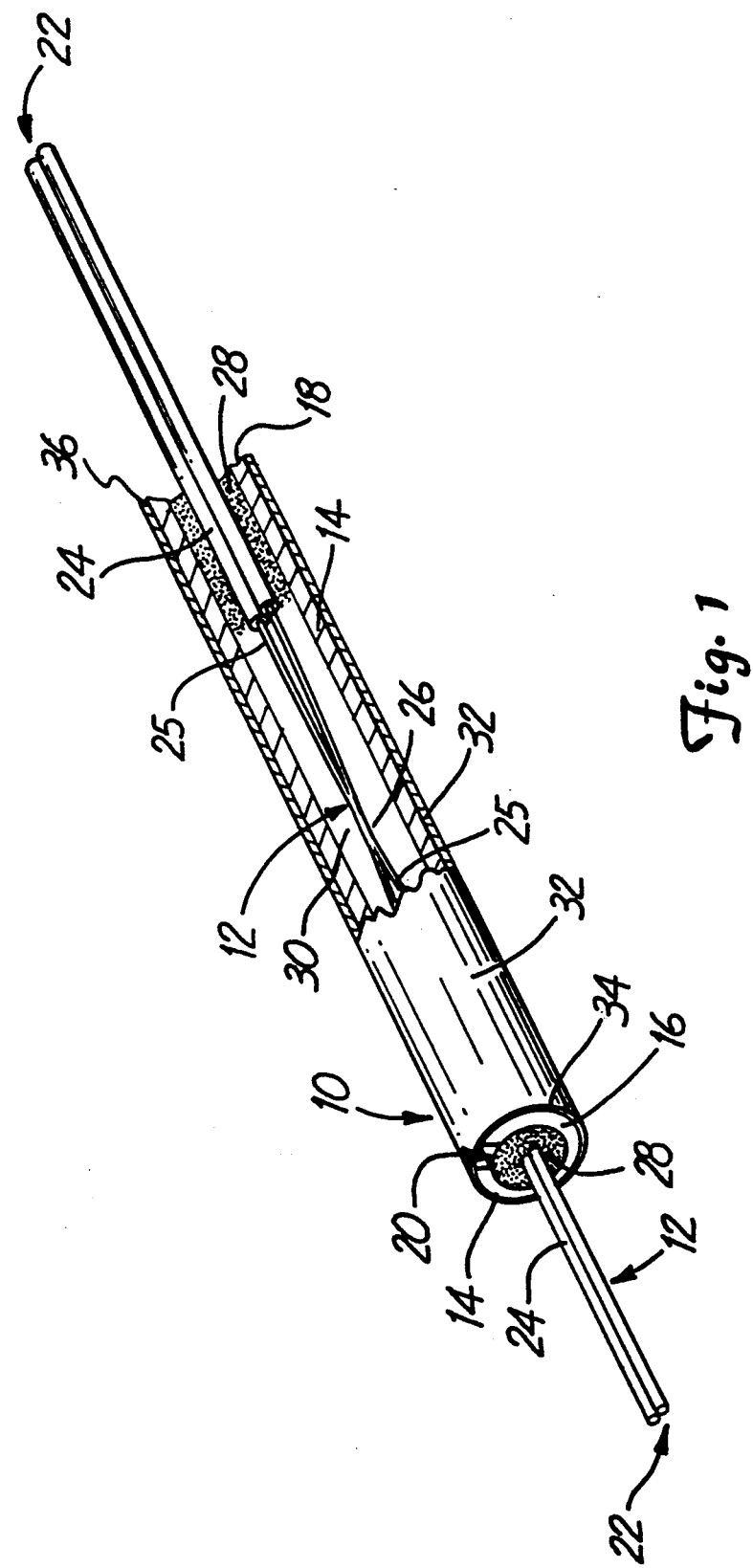

OPTICAL COUPLER HOUSING

BACKGROUND OF THE INVENTION

The present invention relates generally to a housing for an optical coupler and, more particularly, to a housing for an optical fiber directional coupler.

An optical fiber directional coupler is used in optical fiber interconnection arrangements to couple electromagnetic waves from one of two or more optical fibers to another fiber in the group (alternatively, to couple one optical fiber to itself to form a loop). Such couplers have been used in optical communications, optical sensors, and fiber-optic gyros. One example is an optical fiber directional coupler formed by fusing and tapering two or more polarization maintaining optical fibers together. Fabrication of such a coupler generally involves aligning the principal birefringent axes of two or more polarization maintaining fibers, bringing them together, followed by heating those fibers to fuse and taper the fibers resulting in a fused and tapered region for coupling of optical power.

One type of polarization maintaining fiber includes a pair of stress applying parts having an optical core positioned parallel to, and between those parts. A glass cladding encases the stress applying parts and the optical core therein, with the cladding covered by a protective polymer jacket. The cladding must have an index of refraction less than that of the optical core to maintain total internal reflection within the core. The stress applying parts of the polarization maintaining fiber must have an index of refraction matched with that of the cladding to less than 0.2% of the cladding index in order to avoid higher order mode, or higher reflection angle, coupling. The cladding diameter needs to be small so that low loss and small sized coupler packages can be realized.

The stress applying parts create birefringent axes, a first principal axis and a second principal axis, along the fiber. Typically, the second principal axis is the intersection with a cross section of a fiber of a surface passing through the pair of stress applying parts and the optical core, and along which a propagating wave travels relatively slowly. The first principal axis, or fast axis, is rotated by 90° with respect to the second principal, or slow axis, but also intersects the optical core. These axes can be identified by viewing a cross-section of the fiber under a microscope. Maintaining polarization in electromagnetic waves propagating through a coupler typically requires close alignment of the birefringent axes of the joined fibers.

The excess loss of the coupler, reflecting the net optical power loss due to the presence of the coupler, is defined as:

$$L = -10\ LOG(P1+P2)/PT$$

where,

P1 is the direct transmission fiber output optical power.

P2 is the coupled transmission fiber output optical power.

PT is the total optical power coupled to the direct transmission fiber input.

The polarization extinction ratio of the coupler, indicating the coupling of a wave of one polarization propagating therethrough to the opposite polarization mode, is defined as:

$$ER = 10\ LOG(Pf/Ps)$$

where,

Pf is the output optical power detected along the first principal axis of the direct transmission fiber being tested or a principal axis of the coupled transmission fiber aligned therewith being tested, where polarized optical power is coupled to the input of a direct transmission fiber along the first principal axis.

Ps is the output optical power detected along the second principal axis of the direct transmission fiber being tested or a principal axis of the coupled transmission fiber aligned therewith being tested, where polarized optical power is coupled to the input of a direct transmission fiber along the first principal axis.

A well designed and fabricated coupler will have a low insertion loss and a high extinction ratio even after being positioned in a housing.

The optical signal processing performance of an optical fiber directional coupler in various environments typically depends upon the type of housing in which it is positioned for protection, and on the methods used to assemble the housed coupling. In a fused optical directional coupler, for instance, the fused and tapered portions of the coupler where the transfer of optical power takes place are structurally weak and sensitive to environmental conditions. The materials used in the housing for such a coupler must have thermal expansion properties as close as possible to the thermal expansion properties of the fused silica used in the making of optical fibers. The polarization extinction ratio and the transmissibility of the coupler can be degraded if the materials used in the housing subject the fibers to a nonuniform distribution of stresses either during the fabrication process, or thereafter during use due to changes in the environmental conditions in which it is used.

Quartz glass tubes have been used as a protective covering, and as a support, for the coupled portion in a fused optical coupler formed in a jacketless region of optical fibers. In such an arrangement, the coupled region is typically placed within the slotted quartz glass tube and epoxy is applied at the ends of the tubes to secure the optical fibers extending therefrom, and so the coupler, to the tube. However, difficulties arise in environments in which substantial shock or vibration occurs because of the resulting material movements of the coupled portion of the coupler suspended in the central open portion of the tube.

This problem has in part been overcome by placing the fibers within the bore of such a glass tube and then heating the mid region of the tube so assembled until it collapses about the fibers followed by stretching the tube to reduce the diameter thereof. This method places the glass tube in direct contact with the optical fibers and the coupled portion of the coupler, thereby providing rigid support to the coupled region. This, however, places stresses on the coupler causing losses and other difficulties. Similar stresses arise in a coupler formed by placing two optical fibers between a pair of glass substrates forcing the fiber together at the coupled region through direct contact with the substrates, thus forming rigid support for the coupled portion of the coupler. Therefore, an improved housing for optical fiber directional couplers is desired.

SUMMARY OF THE INVENTION

The present invention provides an optical fiber directional coupler housing having a primary protective body with a receiving space therein. A slot in the primary protective body provides access from the exterior of that body to the receiving space therein. The coupled portion of the coupler to be housed is positioned in the receiving space. A resilient support material having an index of refraction less than that of the coupled portion extends into the receiving space extending between the coupled portion of the coupler which it also at least partially surrounds and the primary protective body. Plugs are typically provided at the ends of the protective body to secure the optical fibers extending from the coupled portion to the body.

BRIEF DESCRIPTION OF THE DRAWINGS

FIG. 1 shows a perspective view of the present invention.

DETAILED DESCRIPTION OF THE PREFERRED EMBODIMENTS

A housing, 10, for an optical fiber directional coupler, 12, having such a coupler therein, is shown in FIG. 1. A cylindrical quartz glass tube, 14, having a first end, 16, and a second end, 18, serves as an inner or primary protective body for optical fiber directional coupler 12. Quartz glass tube 14 is cut from 2.2 mm silica capillary tubing to a length generally ranging between 25 and 38 mm as measured between ends 16 and 18.

A slot, 20, approximately 0.33 mm in width is provided along the length of the quartz glass tube 14, and is typically provided by cutting the wall of the quartz glass tube 14 along its direction of elongation with a diamond saw. Slot 20 provides access to an interior hollow portion, or receiving space, of quartz glass tube 14 to allow coupler 12 to be conveniently placed therein. Openings, one at each of ends 16 and 18 of quartz glass tube 14, provide exits for corresponding parts excess portions of optical fibers beyond coupled region part of coupler 12.

Quartz glass tube 14 is then thoroughly cleaned in an ultrasonic acetone bath followed by multiple rinsings in methanol and distilled water without drying between rinses, thus removing any contaminants from its surface. Quartz glass tube 14 is then blown dry with nitrogen gas. Quartz glass tube 14, now clean, is immediately used in forming a housing 10 for coupler 12.

Coupler 12 includes two polarization maintaining optical fibers, 22, each generally clad with a polymer jacket, 24, and each having a portion thereof removed near a region where the pair of optical fibers 22 are joined to form a jacketless region 25. The joining of the pair of fibers 22 by fusing and tapering results in a coupled portion, 26, having a first excess portion of this pair of polarization maintaining optical fibers 22 and a second excess portion of these fibers extending from opposite sides of coupled portion 26. The excess portion of polarization maintaining fibers 22, in extending from the coupled portion 26, pass through the corresponding hole or opening located at ends 16 and 18 of glass tube 14. Coupled portion 26 is positioned in tube 14 so as to avoid contact with that tube.

An epoxy adhesive is first wicked into open ends 16 and 18 of quartz glass tube 14 between tube 14 and coupler 12 until this epoxy adhesive fills these openings and covers jacket 24 of fibers 22 to within 1 mm of jacketless region 25 of fibers 22 extending from coupled portion 26. This epoxy is then cured in ultraviolet radiation of 315 nanometer wavelength for approximately 20 minutes, and then further cured in infrared radiation at 100° C. for one hour. The epoxy adhesive then completes curing at room temperature for 24 hours. As a result, coupler 12 is suspended by hardened epoxy plugs, 28, between coupler 12 and quartz glass tube 14. Epoxy plugs 28 are located in the hollow portion of tube 14 such that there is no direct contact between coupler 12 and quartz glass tube 14. The optical fiber portions extending from coupled portion 26 and passing ends 16 and 18 of tube 14 are therefore fixedly supported by epoxy adhesive plugs 28 where they emerge from quartz glass tube 14. A satisfactory material for epoxy adhesive 28 is designated ELC 4481, available from Electro-Lite Corporation of Danbury, Conn.

The region between coupled portion 26, quartz glass tube 14 and between the epoxy suspension plugs 28, is substantially filled with a clear silicone material, 30, as a material for mechanically supporting coupled portion 26. Silicone material 30 is cured at room temperature for 24 hours. This support material, being resilient, supports coupled portion 26 so as to prevent undue excursions thereof and to dampen whatever motion is imparted thereto during vibration or shocks thereto. Next, quartz glass tube 14, with coupler 12 housed therein, is temperature cycled 8 times from −55° C. to 90° C. The coupler is then tested to determine the excess loss and the extinction ratio resulting, both prior to completing the packaging process.

Coupled portion 26, being quartz glass, has an index of refraction of approximately 1.45. Silicone support material 30, being in contact with coupled portion 26, should have an index of refraction less than 1.45 so as to maintain total internal reflection of the fiber to avoid an undue insertion loss. A satisfactory material for clear silicone material 30 having an index of refraction of approximately 1.42 is designated Dow Corning®93-500 Space-Grade Encapsulant, available from Dow Corning Corporation of Midland, Mich.

A cylindrical stainless steel tube, 32, having a first end, 34, and a second end, 36, serves as an outer, or secondary, protective body for coupler 12. Stainless steel tube 32, having an interior bore or cavity with a diameter slightly larger than an outer diameter of quartz glass tube 14, is cut by a standard tube cutting means to a length as measured between its ends 34 and 36 substantially equal to the length of quartz glass tube 14. An opening or hole at each end of stainless steel tube 32 provides access from the exterior to an interior hollow portion or cavity in stainless steel tube 32, allowing quartz glass tube 14 to be positioned conveniently therein. Quartz glass tube 14, coated with a thin layer of silicone adhesive, is positioned within the bore or cavity of stainless steel tube 32. The silicone adhesive, after curing, attaches, or secures, stainless steel tube 32 to quartz glass tube 14. A typical silicone adhesive capable of elastically bonding stainless steel to quartz glass is satisfactory and is readily available from commercial sources.

Although the present invention has been described with reference to preferred embodiments, workers skilled in the art will recognize that changes may be made in form and detail without departing from the spirit and scope of the invention.

What is claimed is:

1. A housing for an optical fiber directional coupler formed of a plurality of optical fibers having a coupled portion at which electromagnetic waves can be coupled therebetween and at least one excess portion of an optical fiber extending beyond said coupled portion, said housing comprising:

a primary protective body having a receiving space therein and having a slot means therein providing access to said receiving space from outside, said receiving space extending into said primary protective body past said slot, said coupled portion of a said coupler to be housed being positioned in said receiving space; and a support material at least partially about said coupled portion of said coupler and extending in said receiving space to said primary protective body, said support material being resilient and having an index of refraction less than that of said coupled portion.

2. The apparatus of claim 1 further comprising a suspension means to fixedly hold a part of said excess portion in said receiving space near a location where said excess portion emerges from said primary protective body, said suspension means being positioned between said location of emergence of said excess portion and said support material.

3. The apparatus of claim 2 wherein said suspension means comprises an epoxy adhesive.

4. The apparatus of claim 1 wherein the primary protective body comprises a quartz glass tube.

5. The apparatus of claim 4 wherein said slot means comprises a wall portion removed between opposite ends of said tube.

6. The apparatus of claim 1 wherein said support material substantially fills said receiving space surrounding said coupler.

7. The apparatus of claim 1 wherein said support material comprises a silicone material.

8. The apparatus of claim 1 further comprising a secondary protective body having a cavity therein and having an opening therein providing access to said cavity from outside, said primary protective body being positioned in said cavity to cover at least in part said slot.

9. The apparatus of claim 8 further comprising a securing means to attach said secondary protective body to said primary protective body.

10. The apparatus of claim 9 wherein said secondary protective body comprises a metal tube.

11. The apparatus of claim 10 wherein the securing means comprises a silicone adhesive positioned between said primary protective body and said secondary protective body.

12. The apparatus of claim 11 wherein said optical fibers have a protective jacket thereon.

13. The apparatus of claim 12 wherein a portion of the protective jacket is removed from said optical fibers forming a jacketless region.

14. The apparatus of claim 13 wherein said jacketless region of at least two optical fibers have a coupled portion.

15. The apparatus of claim 14 wherein said coupled portion has a first excess portion and a second excess portion of optical fiber oppositely extending beyond said coupled portion.

16. The apparatus of claim 15 further comprising a suspension means to fixedly hold a part of said first excess portion near a first location where first excess portion emerges from said primary protective body, and to fixedly hold a part of said second excess portion near a second location where said second excess portion emerges from said primary protective body, capable of suspending said coupled portion, prohibiting contact between said coupled portion and said primary protective body.

17. The apparatus of claim 16 wherein said suspension means comprises an epoxy adhesive.

* * * * *